United States Patent [19]
Brown

[11] 4,158,395
[45] Jun. 19, 1979

[54] WEIGHING DEVICE USING A RESONANT MASS-SPRING SYSTEM

[75] Inventor: George J. Brown, Capistrano Beach, Calif.

[73] Assignee: Christopher Scientific Company, Anaheim, Calif.

[21] Appl. No.: 821,705

[22] Filed: Aug. 4, 1977

[51] Int. Cl.² ............................................. G01G 3/14
[52] U.S. Cl. ............................................. 177/210 FP
[58] Field of Search ............. 177/210 FP, 210 R; 73/141 R, DIG. 1

[56] References Cited

U.S. PATENT DOCUMENTS

| | | | |
|---|---|---|---|
| 3,322,222 | 5/1967 | Baur | 177/210 FP |
| 3,423,999 | 1/1969 | Wirth et al. | 73/141 R |
| 3,612,198 | 10/1971 | Gallo | 177/210 FP |
| 3,621,713 | 11/1971 | Wirth et al. | 73/DIG. 1 |
| 3,692,128 | 9/1972 | Gallo | 177/210 |
| 3,724,573 | 4/1973 | Saner | 73/DIG. 1 |
| 3,805,605 | 4/1974 | Saner | 73/DIG. 1 |
| 4,010,638 | 3/1977 | Gallo | 73/DIG. 1 |
| 4,043,190 | 8/1977 | Gallo | 73/141 R |
| 4,070,900 | 1/1978 | Engels | 177/210 FP X |
| 4,075,887 | 2/1978 | Gallo | 73/141 R |

Primary Examiner—George H. Miller, Jr.
Attorney, Agent, or Firm—Jackson & Jones

[57] ABSTRACT

A damping reduction suspension system is used in conjunction with a frequency dependent mass measuring unit to increase the accuracy and speed of mass measurement. The damping reduction system comprises a relatively low frequency suspension system coupled dynamically with a relatively high frequency mass measuring unit to minimize energy loss from the oscillating measuring element.

12 Claims, 5 Drawing Figures

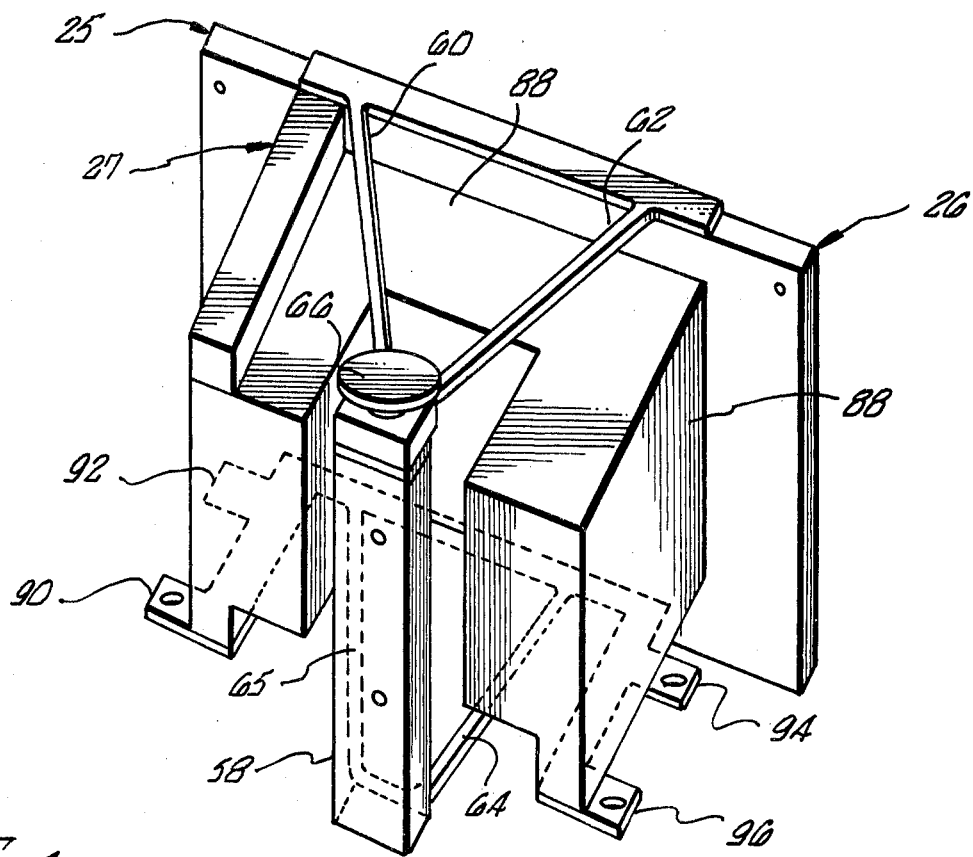
FIG_4_
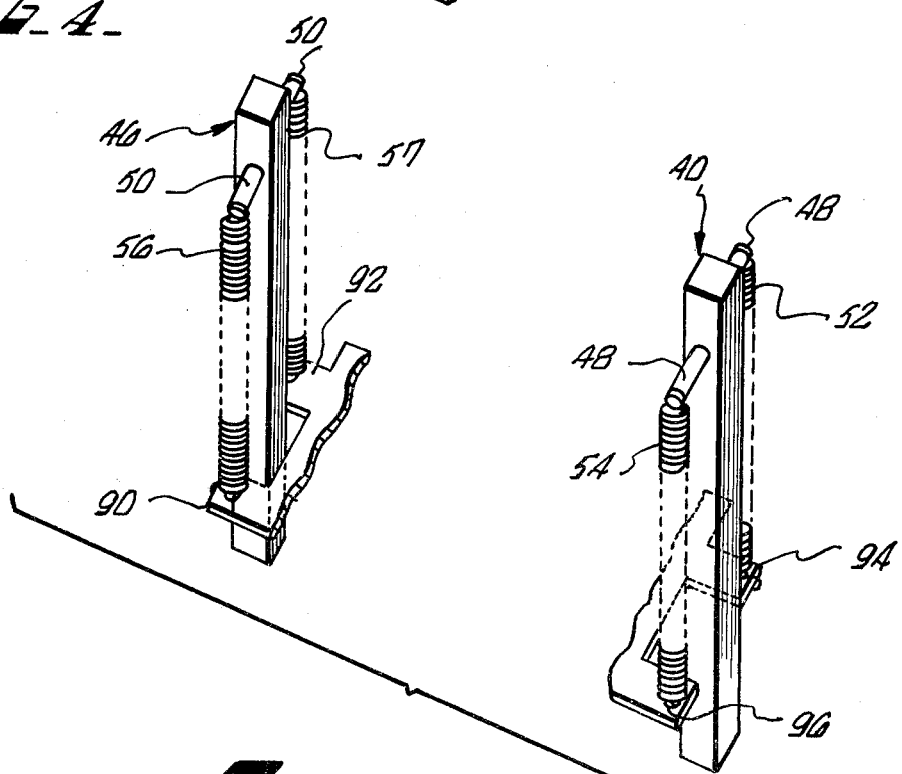
FIG_3_

WEIGHING DEVICE USING A RESONANT MASS-SPRING SYSTEM

BACKGROUND OF THE INVENTION

1. Field of the Invention

The present invention relates to mass measuring units of the type that determine mass by noting changes in the resonant frequency of an oscillating mechanical system as a result of adding the mass to be measured to the oscillating element.

2. Brief Description of the Prior Art

The principle that the angular frequency of an oscillating mechanical system will change with a change in mass of the oscillating element is well known and has been used to determine mass.

Some of these mass measuring units utilize vibrating strings. These devices depend upon a frequency change in the vibrating string caused by a change in string tension. The tension is changed by increasing the weight pulling on the string. Thus, a change in weight can be determined by noting the change in the resonant frequency of the vibrating string.

The present invention oscillates the mass to be measured. Specific frequency of these oscillations is irrelevant to the measurement performed therein. Devices of this type which oscillate the mass to be measured however, operate at relatively high levels of damping and hence, accurate measurements cannot be made with these devices.

Some effort has been made in the past to reduce what are called "mounting" or "mechanical" losses caused by a transfer of energy from the vibrating system to the ground. The resultant devices have the oscillating member attached to a base which is not free to move relative to the oscillating member. This allows energy to be transmitted out of the oscillating element to the support structure whose own frequency characteristics directly effect the resonant condition of the measuring element.

OBJECTS AND SUMMARY OF THE INVENTION

An object of this invention is to provide an improved suspension system for a frequency dependent mass measuring unit.

Another object of the present invention is to minimize the loss of energy from the oscillating element.

Yet another object of the present invention is to provide one dimensional stability to every oscillating element in a system of highly elastic suspension members to thereby prevent distortion due to "wobbling".

The present invention achieves these objectives by suspending the measuring platform for an unknown mass by a plurality of flexible struts disposed about the platform so that it has only one degree of freedom. These struts are then anchored to a relatively heavy intermediate mass, itself suspended by struts which allow movement substantially in only one degree of freedom. By making this intermediate mass heavy relative to the primary mass, which is comprised of the measuring platform and unknown mass, the frequency of oscillation of the intermediate mass can be orders of magnitude less than the frequency of oscillation of the primary mass. This low frequency system acts as a low pass mechanical filter reducing the energy flow from the system. It also prevents significant distortion due to acceleration of the primary mass by motion of the intermediate mass.

BRIEF DESCRIPTION OF THE DRAWINGS

The exact nature of the present invention will become readily apparent following a detailed description when taken in conjunction with the accompanying drawings in which:

FIG. 3 is a perspective view of the biasing spring suspension system of the intermediate mass.

FIG. 4 is a perspective view of the primary mass and its strut suspension system.

DESCRIPTION OF THE PREFERRED EMBODIMENTS

Figure 1:
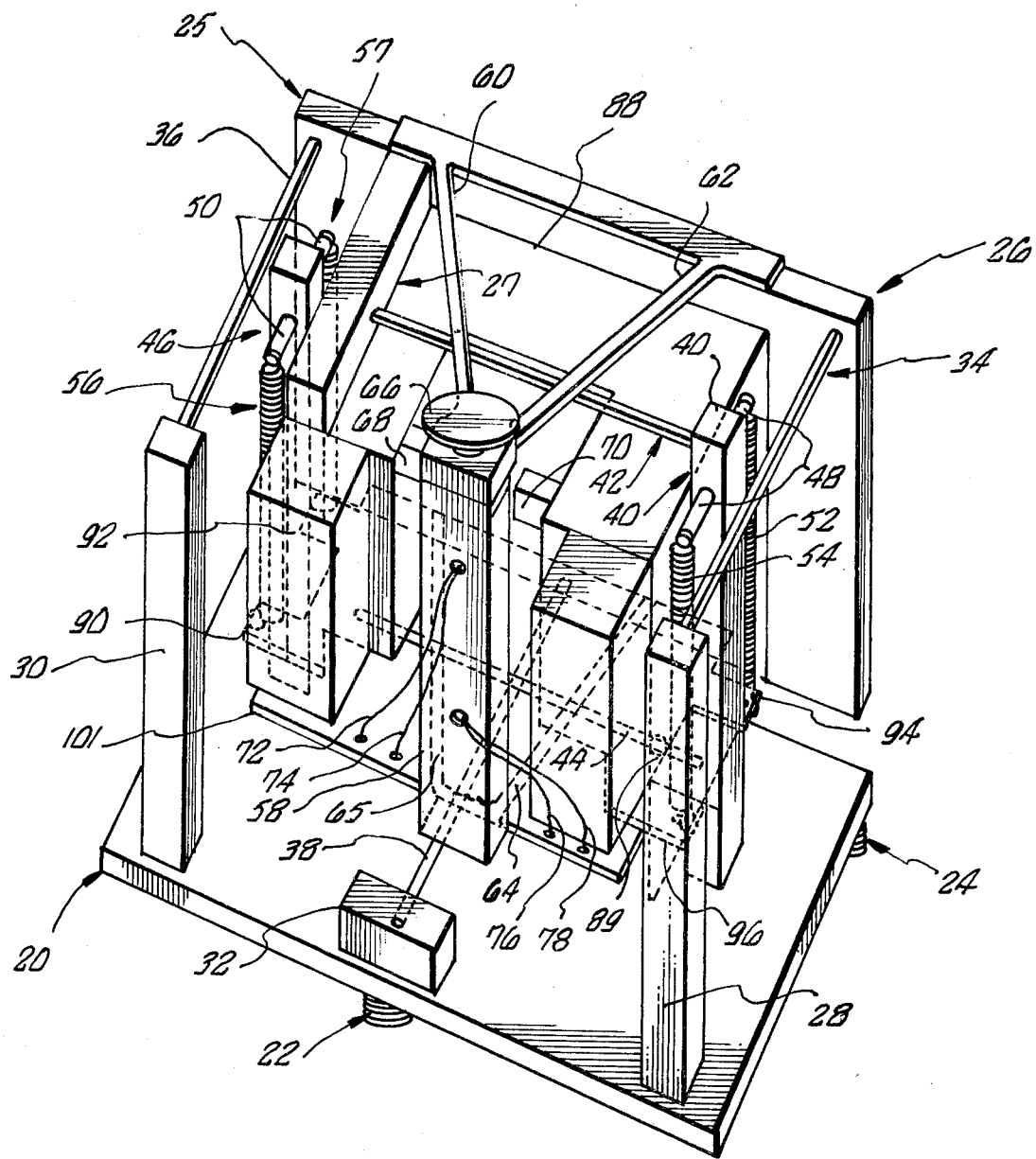
FIG. 1 is a front perspective view of the composite mass measuring unit.

An illustration of the basic physical equations for a one dimensional oscillator will demonstrate the utility of reducing mechanical damping to the maximum possible extent when mechanical oscillation is sought to be used as a high accuracy mass measuring unit.

In a mechanical oscillator, the restorative force, $F_r$, is a constant, k, times the distance, x, the system is displaced from its equilibrium position. Thus, $$F_r = -kx.$$

The damping force is a constant, b, times the velocity of movement of the system, $$\frac{dx}{dt},$$

and therefore, $$F_d = -b\frac{dx}{dt}.$$

These forces are equal to the mass of the system times its acceleration, $$m\frac{d^2x}{dt^2}.$$

Thus, $$F_r + F_d = -kx - b\frac{dx}{dt} = m\frac{d^2x}{dt^2}.$$

When an external force of $F_o \cos \omega t$ is applied to the oscillator, then the sum of the forces still equals mass times acceleration, or $$F_o \cos \omega t - kx - b\frac{dx}{dt} = m\frac{d^2x}{dt^2}$$

or $$m\frac{d^2x}{dt^2} + b\frac{dx}{dt} + kx = F_o \cos \omega t \qquad (1)$$

which is the differential equation of a one dimensional oscillator with an external force $F_o \cos \omega t$ operating on it.

If we let $$\omega_0 = \sqrt{\frac{k}{m}},$$

which is the natural frequency of undamped vibration of the one dimensional oscillator, the general solution for equation (1) is $$x = Ce^{-\frac{b}{2m}t} \cos\left(\sqrt{\frac{k}{m} - \frac{b^2}{4m^2}}\, t - \gamma\right) + \frac{F_o}{\sqrt{m^2(\omega_o^2 - \omega^2)^2 + b^2\omega^2}} \cos(\omega t - \phi) \quad (2)$$

See p. 177 of Joos,

Theoretical Physics, Third Edition. According to Joos, the first term represents a damped vibration having the period of the characteristic free vibration of the damped system, i.e., it corresponds to a transient phenomenon determined by the initial conditions, which determine C and $\gamma$. This part dies out over time. The second term represents a permanent vibration of the same period as the exciting force. This is the steady state.

Another form of the general solution is $$x = ae^{i(\omega t - \phi)},$$

in which "a" is a constant representing the amplitude caused by exciting force, $F_a$. If $$F_a = F_o e^{i\omega t},$$

from equation (1) we find $$a\left(\omega_o^2 - \omega^2 + i\frac{b\omega}{m}\right) = \frac{F_o}{m} e^{i\phi}. \quad (3)$$

The vector sum of the real component, $a(\omega_o^2 - \omega^2)$ and the complex component, $$i\frac{ab\omega}{m},$$

must equal $(F_o/m)$, or graphically

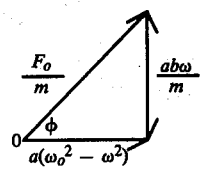

Using the Pythagorean theorem, we find that $$a = \frac{F_o}{\sqrt{m^2(\omega_o^2 - \omega^2)^2 + b^2\omega^2}} \quad (4)$$

which is the same amplitude constant as for equation (2). Therefore, $$\tan \phi = \frac{b\omega}{m(\omega_o^2 - \omega^2)} \quad (5)$$

where $\phi$ is the phase angle between the exciting force, $F_o \cos \omega t$, and the displacement of the forced vibration, $a \cos(\omega t - \phi)$. This difference in phase angle depends upon the difference $\omega_o^2 - \omega^2$, which is the difference between the squares of the natural undamped angular frequency and the angular frequency of the exciting force. This phase difference approaches zero when $\omega$ is small, which is to be expected, i.e., the mass will closely follow the slowly moving input force. And when $\omega = \omega_o$, the phase difference is $\pi/2$. At this point, the mass will have its maximum velocity as it crosses $x_o$, the equilibrium position. This follows from the maximum of the function $$\frac{\omega^2}{m^2(\omega^2 - \omega_o^2) + b^2\omega^2} \quad (6)$$

which is the square of the amplitude constant for the derivative dx/dt.

The maximum of the square of the amplitude involves the maximum of the function $$\frac{1}{m^2(\omega^2 - \omega_o^2)^2 + b^2\omega^2} \quad (7)$$

Thus the maximum amplitude lies at $$\omega^2 = \omega_o^2 - b^2/2m^2 \quad (8)$$

Substituting equation (8) into equation (4), we find the maximum amplitude to be $$a_{max} = \frac{F_o}{b\omega_o} \quad (9)$$

From equation (9) we can see that the amplitude becomes larger and more sharply defined as damping, b, becomes smaller. Indeed, if b=0, amplitude would go to infinity at $\omega = \omega_o$.

Therefore, because the accuracy of the system somewhat depends upon a large and sharply defined amplitude peak, the accuracy of the system can be vastly increased by holding damping, b, to a minimum.

The present invention accomplishes this by effectively isolating the vibrating system from the environment. Isolation minimizes energy flow from the system, for any loss of energy is itself a form of damping.

Isolation is accomplished by means of a very "soft" suspension system. In the past such a suspension system presented difficulties which made its use infeasible. It introduced distortion caused by "wobbling", i.e., motion in degrees of freedom other than the vertical which would be sensed by the measuring system. The structure of the suspension system of the present invention overcomes these difficulties. Also, suspensions using elastomers had high levels of damping themselves, resulting in poor isolation characteristics. The lower the damping in the support system, the better the isolation and the lower the energy loss.

Further, with a soft suspension system having a heavy intermediate mass, the frequency and speed of oscillation will be quite slow compared to the frequency of oscillation of the primary mass. Therefore, distortion in the motion of the primary due to its being accelerated by motion of the intermediate mass can be discounted because the acceleration will be relatively insignificant.

Additional isolation is achieved by supporting the primary low frequency system itself on a resilient support. This cascades two low frequency systems, further minimizing energy transfer from the measuring element.

A composite drawing of the preferred embodiment is shown in FIG. 1. It comprises a rectangular baseplate 20 to which three springs, 22, 24 and a third spring (not shown), are attached to the bottom of the baseplate and disposed about the baseplate so that the center effort of the springs is the center of mass of the entire unit. The stiffness of the springs $k_s$, is chosen so that the natural frequency of oscillation of the entire mass measuring unit is shown by the formula:

$$\omega_u = \sqrt{\frac{3k_s}{m_u}}$$

where $\omega_u$ is the angular frequency of the mass measuring unit, $k_s$ is the spring constant of one base support spring and $m_u$ is the mass of the entire unit. The natural frequency of oscillating the entire mass measuring unit is approximately 1/10 to 1/20 of the natural frequency of oscillation of the primary mass 58.

The suspension system will now be described with reference to FIG. 1.

Two vertical support posts 28 and 30 extend vertically from the top of the baseplate and lie in a single plane on one side of the baseplate. Support posts 28 and 30 are of equal height. Flexible struts 34 and 36 run in parallel from support posts 28 and 30 respectively, connecting to the rear plate 26 of the intermediate mass 25 in a manner more fully described in the discussion of FIG. 5.

A support post 40 extends vertically from the baseplate to a height equal to support posts 28 and 30 and lies between the plane formed by support post 28 and 30 and the plane formed by the rear plate 26 of the intermediate mass 25 at a point along a line running through the center of mass of the intermediate mass 25 plus the primary mass 58. Flexible struts 42 and 44 run from the support post 40 and connect to the intermediate mass 25, plus the primary mass 58 and at right angles to flexible struts 34 and 36. Strut 42 is at the same height as struts 34 and 36. Strut 44 lies above struts 64 and 65 (FIG. 4) which are attached to the bottom of plate 26.

A support post 46 extends vertically from the baseplate 20 to a height equal to support posts 28, 30 and 40 from a point on the baseplate 20 directly opposite from support post 40 such that, were flexible struts 42 and 44 to be extended, they would intersect the centerline of support post 46. Support posts 40 and 46 have cantilever extensions 48 and 50 respectively which serve as mounting posts for biasing springs 52, 54, 56 and 57. The other end of these 4 biasing springs is connected to extensions 90, 92, 94 and 96 from the bottom of intermediate mass 25.

The primary mass 58 is suspended from the intermediate mass's rear plate 26 by flexible struts 60, 62, 64 and 65. Struts 60 and 62 are attached to the top of the intermediate mass's rear plate 26 and extend to the top of the primary mass 58 so that they both lie above flexible strut 42. Flexible strut 64 and 65 are connected to the intermediate mass's rear plate 26 and to the bottom of primary mass 58 and lie in a plane below flexible strut 44.

A pan 66 is appended to the top of primary mass 58 to receive and hold unknown masses to be weighed.

The intermediate mass 25 also comprises a relatively massive weight 88 mounted between plate 26 and 27 and disposed about primary mass 58. There is a hole 89 in the lower portion of this weight 88 through which strut 44 runs to connect to plate 27.

Mounted on this flexurely supported mass 88 are permanent magnets 68 and 70 and one other pair of identical permanent magnets not shown but arrayed vertically below permanent magnets 68 and 70. These magnets 68, 70 and the others not shown, generate a magnetic field adjacent to primary mass 58. Two coils, (not shown) are mounted on and behind primary mass 58 and lie between the two pairs of magnets. By means of these coils, movement of primary mass 58 in the magnetic field can be both induced and sensed. Wires 72, 74, 76 and 78 are leads to these coils, a first coil for sensing movement, mounted high on primary mass 58, and a second coil for inducing movement, mounted just below it. Wires 72 and 74 are leads to the sensing coil and wires 76 and 78 are leads to the movement inducing coil.

Figure 2:
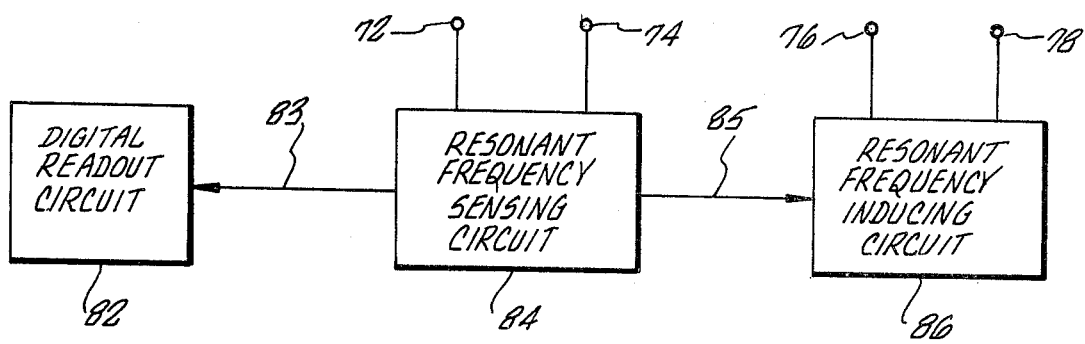
FIG. 2 is a functional block diagram of the accompanying electronics.

Wires 72, 74, 76 and 78 leads to circuit board 101 which contains electronics located separately from the mass measuring unit, a functional diagram of which is shown in FIG. 2.

Referring to FIG. 2, leads 72 and 74 which connect to the sensing coil located on the suspended mass are connected to a resonant frequency sensing circuit 84. This circuit would typically measure the velocity of the suspended mass and provide feedback 85 into the resonant frequency inducing circuit 86, which then would provide power through leads 76 and 78 into the movement inducing coil located on primary mass 78. The power input into the inducing coil would typically be a sine wave of varying frequency. The output of the sensing circuit 84 changes the frequency of the inducing circuit until this frequency is equal to the resonant frequency of the suspended mass, defined in this embodiment as the frequency at which displacement is $\pi/2$ out of phase with the phase of the input force as determined by the phase detector in 84. This occurs when $\omega = \omega_o$. When this resonant frequency is reached 83, the mass of the unknown mass to be weighed on holder 66 can be computed and displayed by the digital readout circuit 82. The resonant frequency sensing circuit 84, inducing circuit 86 and the digital read-out circuit 82 are well known circuits that need not be further described herein.

Figure 5:
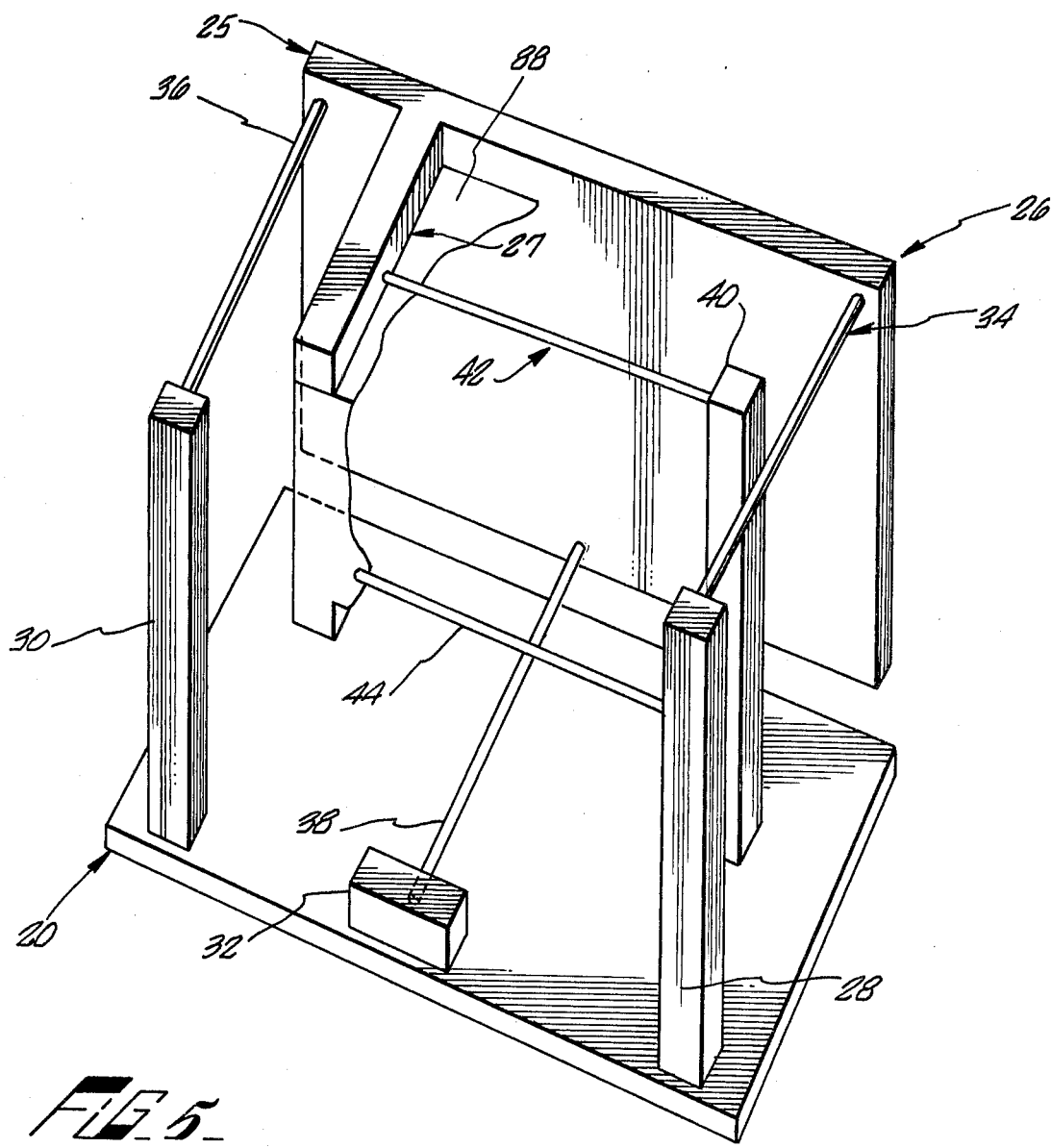
FIG. 5 is a perspective view of the strut suspension system of the intermediate mass.

FIG. 5 shows the functional relationship of the strut suspension system for the intermediate mass 25. The intermediate mass 25 has two rectangular plates, a rear plate 26 and a cantilever plate 27 attached to the rear plate between and parallel to struts 36 and 38 which extends far enough to receive struts 42 and 44. Both plates form planes perpendicular to the baseplate 29. Rear plate 26 forms a plane parallel to the plane formed by support posts 28 and 30. Plate 27 forms a plane perpendicular to plate 26 and is therefore parallel to struts 34 and 36. Plate 26 is parallel to and plate 27 is perpendicular to struts 42 and 44. Struts 34 and 36 intersect the plate 26 near its top and at opposite ends of the plate.

The placement of struts 34, 36, 42 and 44 practically restrains the movement of the intermediate mass 25 in all degrees of freedom but the vertical relative to the baseplate 24. Rotational motion in the plane parallel to struts 34 and 36 may still occur. However, this motion causes almost no distortion in the motion of the primary mass because of its low frequency relative to the frequency of motion of the primary mass.

However, if it is desired to remove this rotational degree of freedom, a strut can be placed at the bottom of plate 26. Therefore, an alternative embodiment would include support post 32 disposed between support posts 28 and 30. Strut 38 would run from this support post in parallel to struts 34 and 36 and connect to the bottom of the intermediate mass's rear plate 26. This strut will restrain the rotational motion in the plane parallel to struts 34 and 36.

The stiffness of the struts 34, 36, 42 and 44 should be chosen so that the natural frequency of oscillation of the intermediate mass 25 is on the order of 1/10 to 1/20 lower than the natural frequency of oscillation of the primary mass 58. The lower this frequency is, the better the degree of isolation and hence less energy will flow from the oscillating primary mass 58 to the baseplate 20. This follows because the energy available in the struts to be transmitted to the baseplate is equal to the kinetic energy, $\frac{1}{2}mv^2$, of the load put on the struts. Because mass remains constant, the kinetic energy can be reduced by reducing v, which means reducing the frequency of oscillation. By providing a secondary suspension system in the base 20 support springs by way of 22, 24, etc., a further reduction in energy outflow from the primary oscillating mass to the surrounding environment is effected. This cascading of two elastic mass-spring like systems thereby achieves a lower energy loss than it would be practical to attain by constructing a single suspension system with a lower natural frequency than either of the two cascaded systems.

Referring to FIGS. 1 and 3, with a "soft" strut suspension system, the intermediate mass will tend to sag noticeably toward the baseplate. This sag causes obvious practical design problems and is overcome by providing biasing springs 52, 54, 56 and 57 to raise the intermediate mass 25 so that struts 34, 36, 42 and 44 are straight when the system is at rest.

The biasing springs connect to the intermediate mass 25 by means of extension 90, 92, 94 and 96 to the bottom of intermediate mass 25. The other end of the biasing springs are hooked onto cantilever extension 48 and 50 from vertical support posts 40 and 46. Because the support posts extend vertically from the baseplate such that a line drawn between them passes through approximately the center of mass of the intermediate mass 25 and the primary mass 58, the center of effort of the biasing springs is also approximately this same center of mass. In practice, it is better to have springs 54 and 56 mounted a little more forward toward posts 28 and 30 so that the center of effort of the biasing springs can be further away from plate 26. This increases the moment of torque of the springs on plate 26, thus effectively raising the intermediate mass 25 to a null position with a smaller spring tension (when the lower strut is in place, this displacement from center becomes unnecessary). As we have seen before, the smaller the spring tension the better because the spring tension adds to the total spring rate, k, of the suspension system and this will increase the angular frequency, $\omega$, of its oscillation.

FIG. 4 illustrates the strut suspension system for the primary mass 58. Struts 60 and 62 run from plate 26 so that they intersect at the top and in the center of and connect to the primary mass 58. Struts 64 and 65 run from the bottom of plate 26 to the primary mass, intersecting the bottom of primary mass 58 in such a fashion that struts 64, 65 and plate 26 form a congruent triangle with struts 60, 62 and plate 26. The two triangles also form planes parallel to one another.

This method of suspending the primary mass allows it to move in only one degree of freedom relative to plate 26. With motion in one dimension, the equation $$\omega_o = \sqrt{\frac{k}{m}}$$

is correct and can be used to measure the mass of an unknown mass placed on the pan 66.

The primary mass' suspension system, struts 60, 62, 64 and 65, has its reaction at the intermediate mass 25. The intermediate mass 25 has a lower natural frequency and does not respond to the higher frequency input from the primary mass 58. As a result, the higher frequency transmission of energy is reduced. The same thing occurs at base 20 (FIG. 1) with its spring supports 22, 24 and a third spring not shown. By the time the high frequency output of the system reaches ground (where it is absorbed) it has been greatly attenuated. The bending strain in the struts 60, 62, 64 and 65 is the same but nearly all the kinetic energy is stored in the potential energy of bending during each cycle, which in effect reduces damping. The remaining energy loss is in internal damping within the material itself and air damping.

Because any loss of energy from the system, due to heat or otherwise, is the cause of damping, this method of mounting the oscillating suspended mass 58 considerably reduces damping which considerably increases the accuracy of the mass measuring unit.

What is claimed is:

1. In a frequency-dependent mass measuring unit having a suspended primary mass capable of holding objects of unknown mass to be weighed, a means for inducing and measuring the resonant frequency of oscillation of the primary mass, and a means responsive to said inducing and measuring means for indicating the weight of the unknown mass, a suspension system comprising:
   a horizontally planar baseplate and support posts extending vertically upward therefrom;
   an intermediate mass;
   means for suspending the intermediate mass from the support posts so that it is free to oscillate relative to the baseplate;
   means for suspending the primary mass from the intermediate mass so that it is free to oscillate relative to the intermediate mass at a natural frequency much higher than the natural frequency of oscillation of the intermediate mass relative to the baseplate.

2. The suspension system of claim 1 wherein said means for suspending the intermediate mass comprises a first plurality of flexible struts where one end of a strut is connected to a support post and the other end to the intermediate mass in such a manner that the intermediate mass is free to oscillate in the vertical degree of freedom relative to the plane of the baseplate.

3. The suspension system of claim 2 wherein said means for suspending the primary mass comprises a second plurality of flexible struts where one end of a strut is connected to said intermediate mass and the other end to said primary mass in such a manner that the primary mass is free to oscillate in only one degree of freedom relative to the intermediate mass.

4. The suspension of claim 1 wherein said means for suspending the primary mass comprises a plurality of flexible struts where one end of a strut is connected to said intermediate mass and the other tend to said primary mass in such a manner that the primary mass is free to oscillate in only one degree of freedom relative the intermediate mass.

5. The invention of claim 3 further including a plurality of biasing springs where one end of a spring is connected to a support post and the other end to the intermediate mass so that the center of effort of the springs is near the center of mass of the intermediate mass plus the primary mass and wherein the springs will raise the intermediate mass so that each of the first plurality of flexible struts is parallel to the plane of the baseplate when the intermediate mass is not oscillating.

6. The suspension system of claim 1 further including a plurality of support springs where one end of a spring is connected to the bottom of said baseplate and extends vertically downward therefrom and wherein the center of effort of the springs is a line passing through the center of mass of said mass measuring unit.

7. The suspension system of claim 3 wherein the flexible struts of the first plurality are metal cylinders having a circular cross section.

8. The suspension system of claim 3 wherein the first plurality of flexible struts comprises four struts the first two of which are connected to two different support posts and run parallel to each other connecting with the intermediate mass;

and wherein the second two struts are connected to the same support post and run in parallel lines to the intermediate mass such that the plane formed by the two struts runs through the center of mass of the intermediate mass plus the primary mass and is perpendicular to each of the first two struts.

9. The suspension system of claim 8 further including a fourth support post lying between and in the same plane as the support posts from which said first two struts run, and a fifth strut running from the said fourth support post in a line parallel to the said first two struts and connecting to the intermediate mass so that the points of connection of the said first two struts and the fifth strut form an isoceles triangle where a bisecting line running from said fifth strut runs vertically from the baseplate.

10. The suspension system of claim 3 wherein;
said primary mass has a top and a bottom;
the second plurality of flexible struts comprises four struts of equal length, two of which lie in a plane horizontal to the baseplate and which intersect and connect to the top of the primary mass at an angle; and
the remaining two struts form a congruent triangle with the first two struts lying in a plane parallel to the plane of the first two struts and which connect to the bottom of the primary mass.

11. The suspension system of claim 1 wherein the natural frequency of oscillation of the primary mass is at least ten times higher than the natural frequency of oscillation of the intermediate mass.

12. The suspension system of claim 6 wherein the natural frequency of oscillation of the entire mass measuring unit upon said plurality of support springs is at least ten times lower than the natural frequency of oscillation of the primary mass.

* * * * *